Feb. 7, 1961 W. J. HOLT, JR 2,971,054
SCANNING DEVICES AND SYSTEMS
Filed Aug. 3, 1956 2 Sheets-Sheet 1
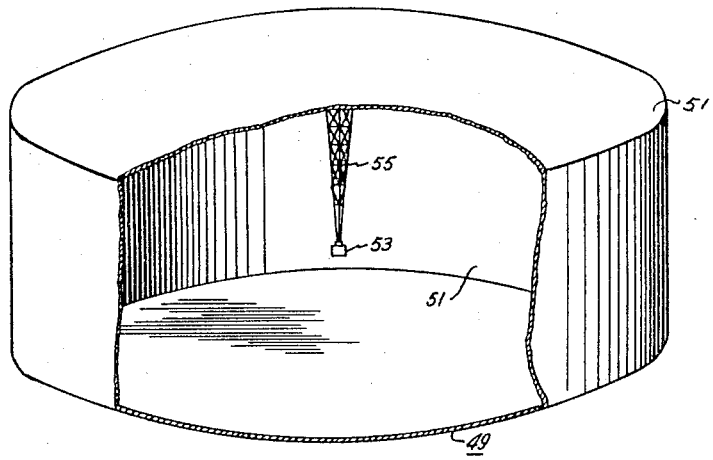
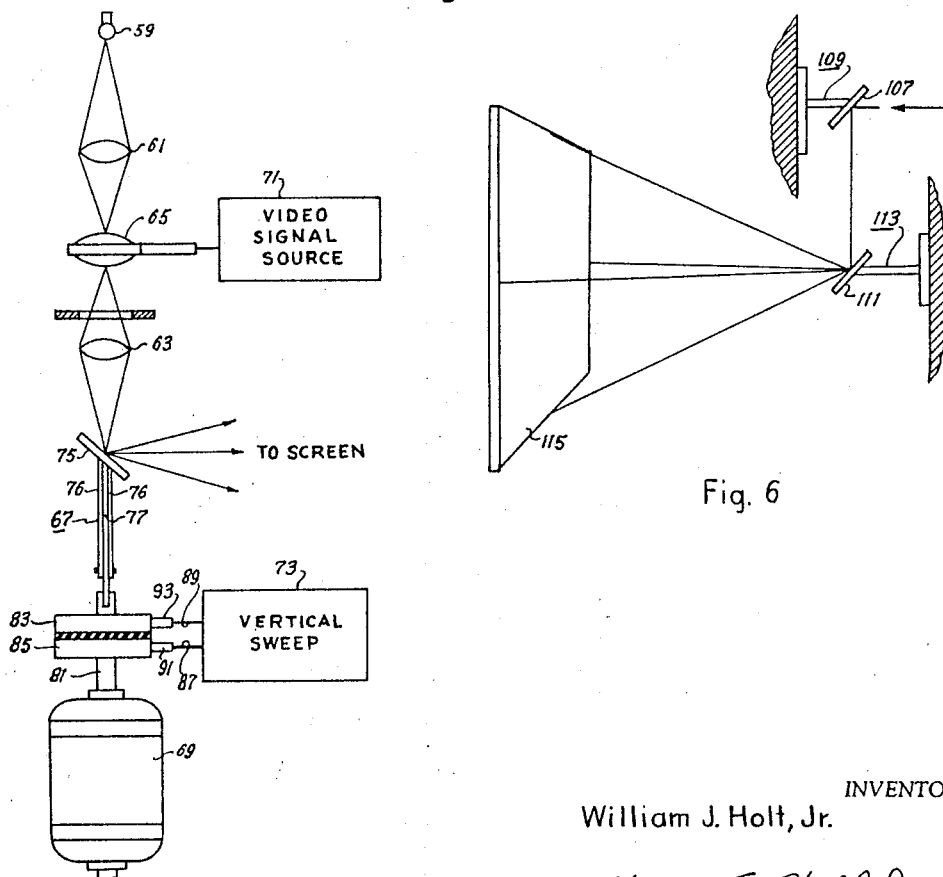
INVENTOR
William J. Holt, Jr.
BY *Wm. T. Wofford*
ATTORNEY

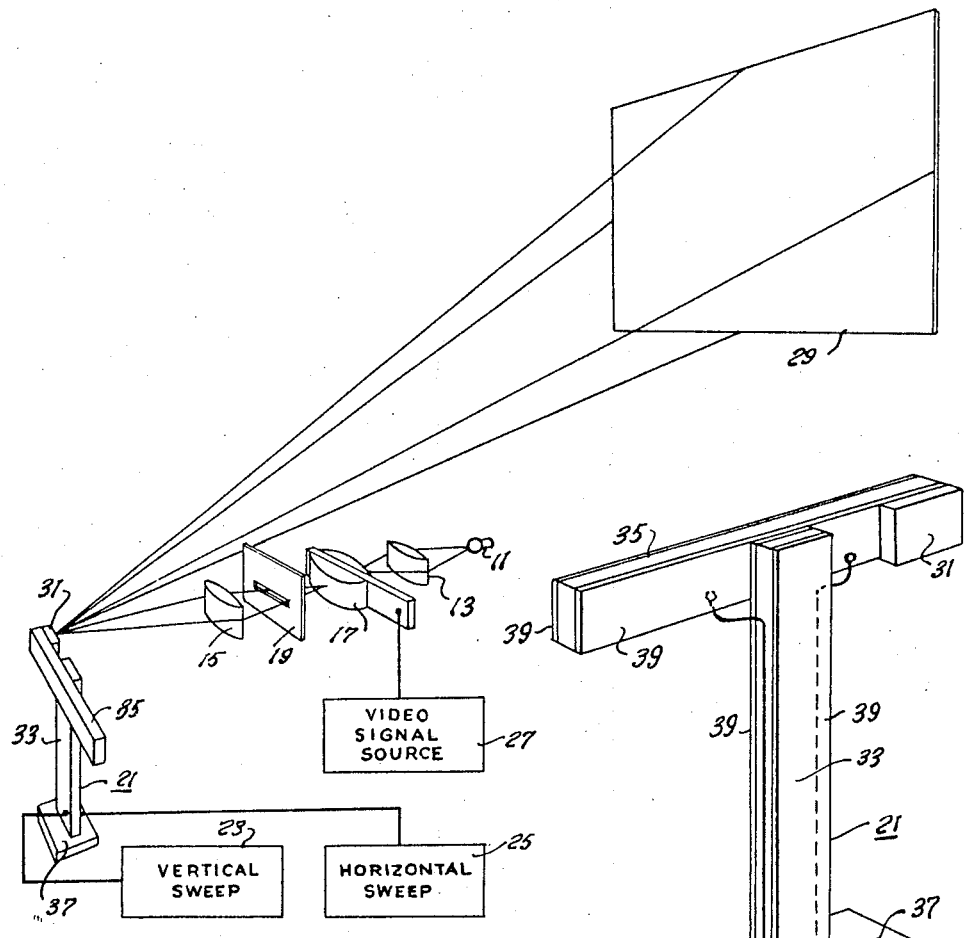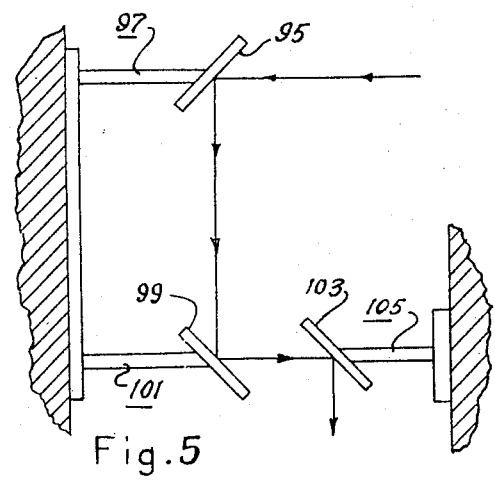

United States Patent Office 2,971,054
Patented Feb. 7, 1961

2,971,054
SCANNING DEVICES AND SYSTEMS

William J. Holt, Jr., Santa Monica, Calif., assignor to Varo Mfg. Co. Inc., Garland, Tex.

Filed Aug. 3, 1956, Ser. No. 602,044
1 Claim. (Cl. 178—7.6)

My invention relates to scanning devices and systems, and particularly to scanning devices and systems for projection of visual information.

Numerous systems have been proposed to accomplish satisfactory presentation of a televised scene on a large screen, but none have proved to be entirely satisfactory. Systems wherein the scene is projected directly from the face of a cathode ray tube by optical means are limited by the relatively low intensity of the image presented by the cathode ray tube. Some efforts have been made to provide a system wherein the projected scene is synthesized by scanning the screen with a high intensity concentrated light beam modulated by video signals. A serious problem in this latter system has been that of devising suitable scanning means. In one scanning means of the prior art of which I am aware, a high speed mirror drum is required to rotate at a speed above 30,000 r.p.m.

Although projected scene presentations are almost universally substantially rectangular, yet in some cases it is desirable to have a panoramic presentation. While some attempts have been made to achieve projected panoramic scene presentations, none have been successful. Here again, the scanning means is a key element in the solution of the problem.

It is a general object of my invention to provide an improved system for projection of visual information.

Another object of my invention is to provide improved scanning devices for use with visual information projection systems.

Another object of my invention is to provide improved scanning devices for use with visual information projection systems wherein the scanning devices shall be readily capable of the requisite scanning speed.

Another object of my invention is to provide a satisfactory system for panoramic projection of visual information.

Another object of my invention is to provide a satisfactory scanning device for use in panoramic projection of visual information.

Another object of my invention is to provide an improved system for projection of visual information wherein light intensity is not a serious problem.

These and other objects are effected by my invention as will be apparent from the following description taken in accordance with the accompanying drawing, forming a part of this application, in which:

Fig. 1 is a schematic diagram illustrating a preferred embodiment of my invention;

Fig. 2 is an enlarged schematic perspective view of the crystal elements shown by Fig. 1;

Fig. 3 is schematic perspective view, partially cut-away, illustrating another embodiment of my invention;

Fig. 4 is a schematic diagram showing an arrangement of components for use in the embodiment of Fig. 3;

Fig. 5 is a schematic view showing another arrangement of crystal elements; and

Fig. 6 is a schematic view showing a further arrangement of crystal elements.

In Fig. 1 there is shown a high intensity light source 11, first and second lenses 13, 15, a Kerr cell, a slit screen 19, a crystal assembly 21, vertical and horizontal sweep generators 23, 25, a video signal source 27, and a projection screen 29. The first lens 13 is interposed between the light source 11 and the Kerr cell 17 and serves to focus a high intensity beam on the cell. The Kerr cell has the property of varying its light output in accordance with applied modulating signals. The video signal source 27 has its output connected to the Kerr cell 17 so that the light output of the cell will be modulated accordingly. The slit screen 19 is interposed between the output side of the Kerr cell and the second lens 15. The slit is arranged to limit the vertical extent of the modulated light beam. The second lens 15 serves to focus the modulated light beam to a spot at a mirror 31 which is a part of the crystal assembly. Details of the crystal assembly are shown by Fig. 2. The crystal assembly comprises a pair of crystal elements 33, 35, a mirror 31, and a mounting base 37. Each crystal element has the shape of a thin rectangular bar. The crystals may be of the strontium or barium titanate family. Each crystal has a layer of conducting material 39 on opposite faces. The first crystal element 33 has its lower end fixed to the base 37 and stands in an upright position thereon. The second crystal element 35 is fixed at a portion of one face to one face of the first at its upper end portion so that the assembly has a T shape. The second crystal element 35 has a small mirror 31 fixed to one face at its end portion. The second crystal element is mounted sufficiently off-center with the mirror end nearer the first crystal than the other end so that the weight of the mirror is compensated and the system is balanced. An energizing lead 41, 43 is connected to each conducting surface of the first crystal 33 adjacent its lower end. Energizing leads 45, 47 for the second crystal 35 run from adjacent the base up opposite edges of the first crystal element and are connected one to each conducting surface of the second crystal. The energizing leads of the first crystal element 33 are connected to the output of the vertical sweep generator 23, while the energizing leads of the second crystal element 35 are connected to the output of the horizontal sweep generator 25. These crystal elements have the property of vibrating in synchronism with an applied energizing signal. The dimensions of the crystals and weight of the mirror may be chosen such that the vibrating crystal are resonant at the frequency of the respective energizing source. The crystal elements vibrate in a manner such that the longitudinal axis becomes alternately convex and concave. Thus, vibration of the first crystal 33 causes the central transverse axis of the mirror 31 to move up and down in a vertical plane, while vibration of the second crystal 35 causes the same axis to move from side to side in a horizontal plane. Thus, by the arrangement of Fig. 1, a high intensity light beam is modulated by video signals and focused to a spot at the mirror 31, which is vibrated in a manner to cause the spot to scan the projection screen 29, synthesizing pictures from the video signal information.

In Fig. 3 there is shown a panoramic theater 49 having a screen 51 in the form of the inside wall of a cylinder. The projection apparatus 53 is attached to the lower end of a boom 55 which extends downward from the theater ceiling 57. Components of the projection apparatus are shown by Fig. 4. In Fig. 4 there is shown a high intensity light source 59, first and second lenses 61, 63, a Kerr cell 65, a crystal assembly 67, an electric motor 69, a video signal source 71, and a vertical sweep generator 73. The first lens 61 is interposed between the light source 59 and the Kerr cell 65 and serves to focus light from the source onto the cell. The video signal source 71 has its output connected to the Kerr cell 65 to produce modulated light at the cell output. The second lens 63 is interposed between the output side of the Kerr cell and the crystal assembly 67, and serves to focus the cell output to a spot at a mirror 75 which is a part of the crystal assembly. The crystal has the shape of a thin rectangular bar having a layer of conducting material 76 on its opposite faces. The crystal 77 has its lower end fixed to the end portion of the shaft 81 of the motor in a manner such that the shaft central axis and the crystal central longitudinal axis coincide. The small mirror 75 is fixed at its center portion to the upper end of the crystal 77 with the plane of the mirror tilted with respect to the shaft axis sufficiently that light reflected from the mirror will strike the vertical center of the panoramic screen 51 when the crystal is at rest. The motor shaft 81 also carries a pair of insulated slip rings 83, 85 one of which is connected to the conducting material on each face of the crystal via leads 87, 89. The slip rings are connected by brushes 91, 93 to the vertical sweep generator 73. The motor 69 is preferably a synchronous type which rotates at a speed suitable to provide a satisfactory horizontal scanning rate. In operation, the projection apparatus 53 is carried at the lower end of the boom 55. The optical axis of the modulated light striking the mirror 75 coincides with the axis of rotation of the mirror. The motor causes the spot to scan the panoramic screen 51 horizontally, while the crystal 77 provides the vertical component of the scanning operation. Thus a panoramic picture is synthesized on the screen from the video signal information.

The arrangement of Fig. 5 shows how a plurality crystal assemblies can be used together to provide amplified sweep extent. Each crystal assembly is of the type described in connection with Fig. 4. Modulated light striking the mirror 95 of the first crystal assembly 97 is reflected to the mirror 99 of the second crystal assembly 101 and from there to the mirror 103 of the third crystal assembly 105 and from there to the projection screen (not shown). The crystal assemblies are driven in synchronism from the sweep signal source (not shown). With this multiple reflection arrangement a greater output beam deflection is obtained for a given degree of crystal vibration.

Fig. 6 shows an arrangement wherein a modulated light beam strikes the mirror 107 of a first crystal assembly 109 and is reflected to the mirror 111 of a second crystal assembly 113 and from there to a projection screen 115. The first crystal assembly 109 is like the one described in connection with Fig. 4 and is mounted to vibrate in a vertical plane. The mirror 111 of the second crystal assembly 113 is parallel to that of the first, but the crystal is mounted to vibrate in a horizontal plane. The modulated light beam thus receives vertical deflection from the first crystal assembly 109 and horizontal deflection from the second crystal assembly 113 so that it is actually caused to scan the projection screen 115.

It may be desirable in some instances to use a high intensity light source that can be directly modulated, such as a xenon short arc lamp, instead of the separate light source and Kerr cell. It is apparent that various combinations of crystal assemblies may be used. While crystals of the type hereinbefore described are preferable, other types may be used, as for example quartz crystals and magnetostricture elements.

The foregoing disclosure and the showings made in the drawings are merely illustrative of the principles of this invention, and are not to be interpreted in a limiting sense.

I claim:

A visual information panoramic projection system comprising: means providing a panoramic screen cylindrical in form; a source of video signals; a light source connected to said video signal source which provides a light beam whose intensity varies in accordance with the variations in the video signals; a scanning device comprising an electric motor having a rotatable output shaft, a crystal element attached to such shaft and projecting longitudinally of and in longitudinal alignment with said shaft, and a mirror carried by said crystal element, said mirror being interposed angularly relative to the longitudinal axis of said shaft and in an optical path between said light source and said projection screen whereby the light beam from the light source is directed to said panoramic screen; and whereby the axis of the light beam from said light source, the central longitudinal axis of the crystal, the axis of said shaft, and the longitudinal axis of the said panoramic screen all coincide; means for providing sweep signals; and means for energizing said crystal with said sweep signals to cause said crystal to deflect the mirror in accordance with said sweep signals about an axis substantially perpendicular to the longitudinal axis of said shaft to cause said mirror to oscillate in directions substantially normal to the longitudinal axis of said shaft whereby the light beam is reflected from the mirror to said projection screen angularly relative to the longitudinal axis of the shaft and oscillates in planes intersecting said axis and substantially longitudinally aligned therewith, said sweep signals and the speed of rotation of said shaft being correlated to provide an image on said screen which corresponds to said video signals.

References Cited in the file of this patent

UNITED STATES PATENTS

| 1,760,198 | Hough | May 27, 1930 |
| 2,059,221 | Fessenden | Nov. 3, 1936 |
| 2,465,898 | Martin | Mar. 29, 1949 |